United States Patent [19]

Fayling

[11] 3,986,206

[45] Oct. 12, 1976

[54] MAGNETIC RECORDING MEDIUM WITH HIGHLY ANISOTROPIC PARTICLES

[75] Inventor: Richard E. Fayling, White Bear Lake, Minn.

[73] Assignee: Minnesota Mining and Manufacturing Company, St. Paul, Minn.

[22] Filed: Jan. 27, 1975

[21] Appl. No.: 544,553

[52] U.S. Cl. .................................. 360/2; 360/131; 235/61.11 D; 235/61.12 M; 340/149 A
[51] Int. Cl.² .................................. G11B 25/04
[58] Field of Search .................... 360/2, 131; 235/61.11 D, 61.12 M; 340/149 A

[56] References Cited
UNITED STATES PATENTS 3,864,754  2/1975  Miklos et al. ................... 360/131
3,878,367  4/1975  Fayling et al. ................ 235/61.12 M Primary Examiner—James W. Moffitt
Attorney, Agent, or Firm—Alexander, Sell, Steldt & DeLaHunt

[57] ABSTRACT

A magnetic recording medium having uniaxially highly anisotropic particles with an easy axis intrinsic coercive force of less than 1900 oersteds. Also disclosed is a machine readable magnetically encoded document employing the medium of the present invention and an apparatus for reading such document and validating the same.

11 Claims, 6 Drawing Figures

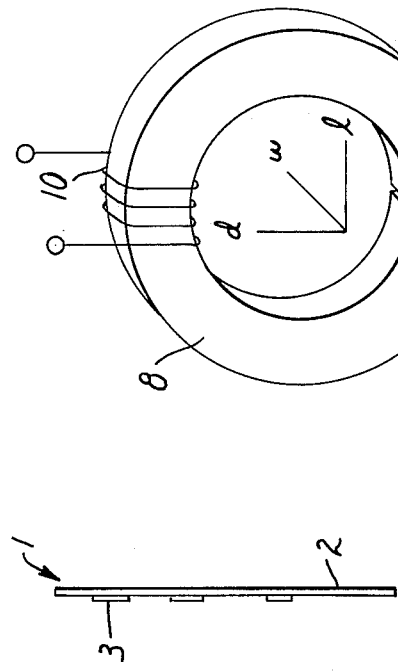
FIG. 3
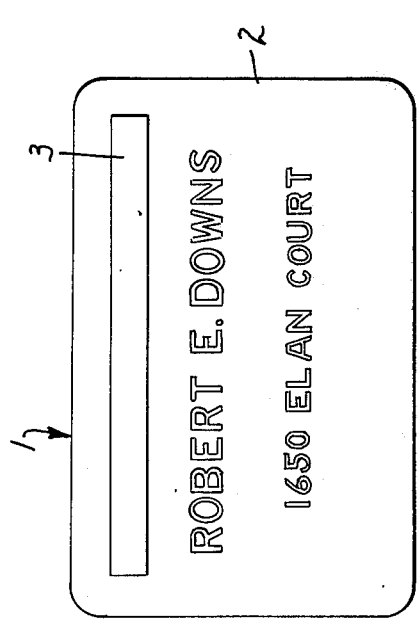
FIG. 4
FIG. 5
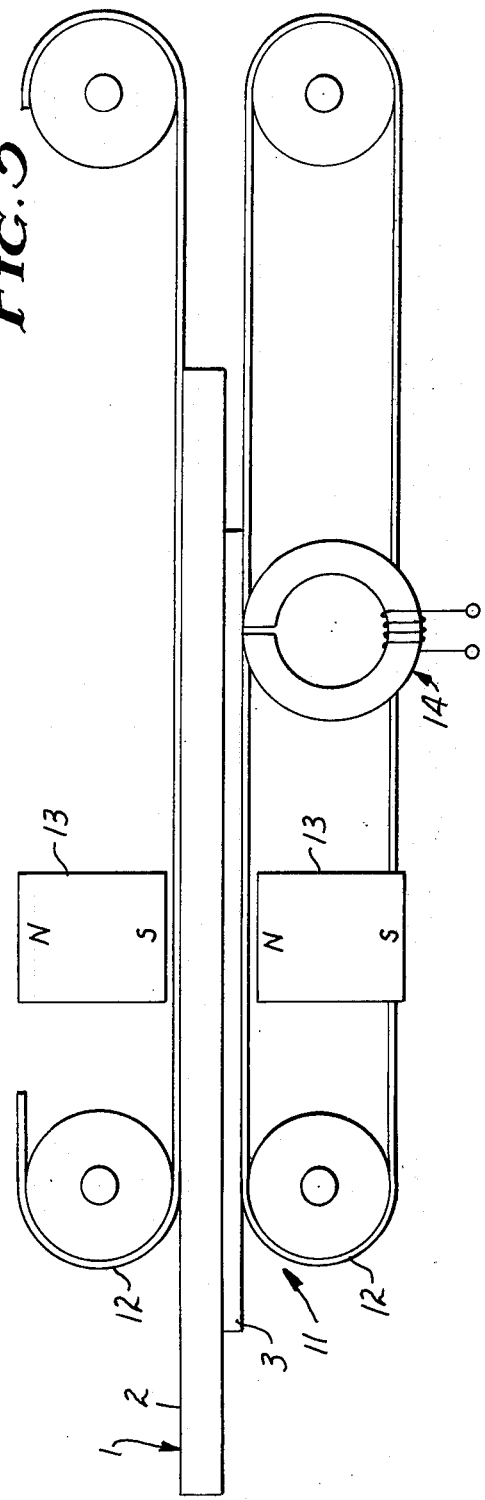
FIG. 6

MAGNETIC RECORDING MEDIUM WITH HIGHLY ANISOTROPIC PARTICLES

CROSS REFERENCE

Related Application

This application is related to my copending application entitled "Dual Particle Population Magnetic Recording Medium," Ser. No. 544,551, filed on even date herewith.

BACKGROUND OF THE INVENTION

1. Field of the Invention

The present invention relates in general to magnetic recording media and more specifically to recording media having highly anisotropic magnetic recording characteristics.

2. Description of the Prior Art

Although performance of reproduction of known recording magnetic media has reached a high level of quality, many uses now exist for magnetic media wherein the usual high quality parameters of such media are less important. For example, in some instances it may be more desirable to provide a magnetic medium that is magnetizable or erasable by only particular magnetic fields than to provide a medium with high reproduction qualities. One highly useful application of a medium magnetizable or erasable by only certain fields is in the area of machine readable magnetically encoded documents such as credit cards.

As society becomes more and more dependent upon the use of magnetically encoded documents as currency substitutes, the need for such documents to be counterfeit resistant and fraud resistant ever increases. Various known magnetically encoded documents are adapted to reduce their use for unauthorized purposes, as evidenced by a U.S. Patent to Holm et al, U.S. Pat. No. 3,566,356, assigned to the assignee of the present invention.

The Holm et al patent discloses a document having a recording medium composed of two magnetizable particle populations that differ from one another in that one population has a relatively low intrinsic coercive force and the other population has a relatively high intrinsic coercive force. The coercive forces of the two particle populations are chosen to provide a gradual demagnetization curve that may be employed to test the validity of the document. Also, Holm et al discloses the use of a sophisticated test for validating the document by the dual recording of information in both populations in a sequence designed to indicate the presence of both high and low coercive force particle populations. Although the Holm et al document provides certain safeguards over nonmagnetic currency substitutes, it is desirable that even more secure currency substitutes are found.

SUMMARY OF THE INVENTION

The present invention provides a magnetically encoded document having a particle population that is uniaxially highly anisotropic with an easy axis intrinsic coercive force of less than 1900 oersteds. The anisotropy of the population is such that when the population is initially magnetized with a field of at least 2500 oersteds applied along the easy axis of the population, the level of residual magnetic moment of the population will be greater than 40% of the initial residual magnetic moment after the application along a hard axis of the population of an a.c. erase field of peak value equal to two times the intrinsic easy axis coercive force of the population.

The particle population of the preferred recording medium of the present invention is produced as discrete crystals of one or more of the compounds of barium, strontium, lead, iron and oxygen and other such compounds of elements having similar magnetic properties. The lower coercive force of the particle population of the magnetic recording medium of the present invention permits recording or erasing of data along the easy axis of such particles with standard recording equipment, but the high anisotropy inhibits recording or erasing along a hard axis of the particles. Such high anisotropic characteristic has been found to be very useful in magnetic media constructions wherein the particles are coated in an organic binder and aligned to produce a medium having a single easy axis of magnetization.

A layer or strip of magnetic recording medium of the present invention can be employed for many uses wherein magnetically recordable labels are required, and such medium is shown herein together with a substrate layer of nonmagnetizable material held in surface-to-surface contact therewith to form a machine readable magnetically encoded document that is both fraud resistant and counterfeit resistant.

An apparatus for reading the magnetically encoded data of such a document and detecting whether the document includes magnetic media of the present invention is also shown. The reading apparatus includes a magnetic field source for providing a magnetic erase field, sufficient to erase conventional recording media, a magnetic transducer for reading the data encoded in the document, and a transport means for first translating the document through the magnetic field of the field source and then past the read transducer. Such translation is made with the easy axis of the medium oriented perpendicular to the source field, but parallel to the gap length of the read gap of the transducer. Thus, if the document does not have a magnetic medium of the present invention, the data recorded on the document will be erased as the document is passed through the source field. Subsequent reading of the card by the read transducer will result in a detection of no recorded data and will thereby indicate the lack of a magnetic medium of the present invention. On the other hand, if the document does have a magnetic medium of the present invention, the source field will not erase data recorded thereon and such data will be detected by the read transducer.

The foregoing and other advantages of the present invention will appear from the following description. In the description reference is made to the accompanying drawings, which form a part thereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

BRIEF DESCRIPTION OF THE DRAWINGS

FIG. 3 is a plan view of a magnetically encoded document having a layer of the recording medium of the present invention;

FIG. 4 is an end view of the encoded document of FIG. 3;

FIG. 5 is a view perspective of a standard magnetic read/record head; and

FIG. 6 is a schematic view of an apparatus for reading the encoded data of the document of FIG. 3.

DESCRIPTION OF THE PREFERRED EMBODIMENTS

The present invention provides a magnetic recording medium including uniformly aligned magnetic particle populations that are uniaxially highly anisotropic, but yet have an intrinsic coercive force of less than 1900 oersteds. The term "uniaxially highly anisotropic" is defined herein to mean that when a magnetic particle population is initially magnetized with a field of at least 2500 oersteds applied along an easy axis of the population, the level of residual magnetic moment of the population will be greater than 40% of the initial residual magnetic moment after the application along one of the hard axes of the population of an a.c. erase field of peak value equal to two times the intrinsic easy axis coercive force of the population.

The recording medium of the present invention is preferably formed by coating highly anisotropic particles in an organic binder in an aligned fashion to produce a single easy axis of magnetization. An intense magnetic response is observed along such easy axis of magnetization and a relatively square hysteresis loop is associated therewith. In contrast, the magnetic response observed due to a magnetic field of 1,000–3,000 oersteds applied along an axis normal to the easy axis of the medium (i.e. along a hard axis of magnetization) is negligible. Thus, the medium appears to be virtually nonmagnetic along the hard axes of the magnetic particles. As a result, the recording medium of the present invention may be readily selectively magnetized and demagnetized along the easy axes of the particles, but yet may be exposed to intense magnetic fields in a direction along their hard axes without significantly being affected.

The highly anisotropic magnetic recording particles employed in the recording medium of the present invention preferably are hexagonal ferrite particles that are generally euhedral platelets. Examples of materials suitable for such particles are lead, barium and strontium ferrites, such as disclosed in U.S. patent application Ser. No. 368,500 filed June 11, 1973 and herein incorporated by reference and iron cobalt phosphide. It is also believed that several types of material such as other transition metal phosphides, yttrium cobalt, rare earth cobalt compounds, manganese bismuth, Alnico compounds, iron-cobalt alloys, chromium dioxide or iron borides would exhibit highly anisotropic behavior of the type desired if single domain size particles of sufficient crystal perfection are developed from such materials.

Figure 1:
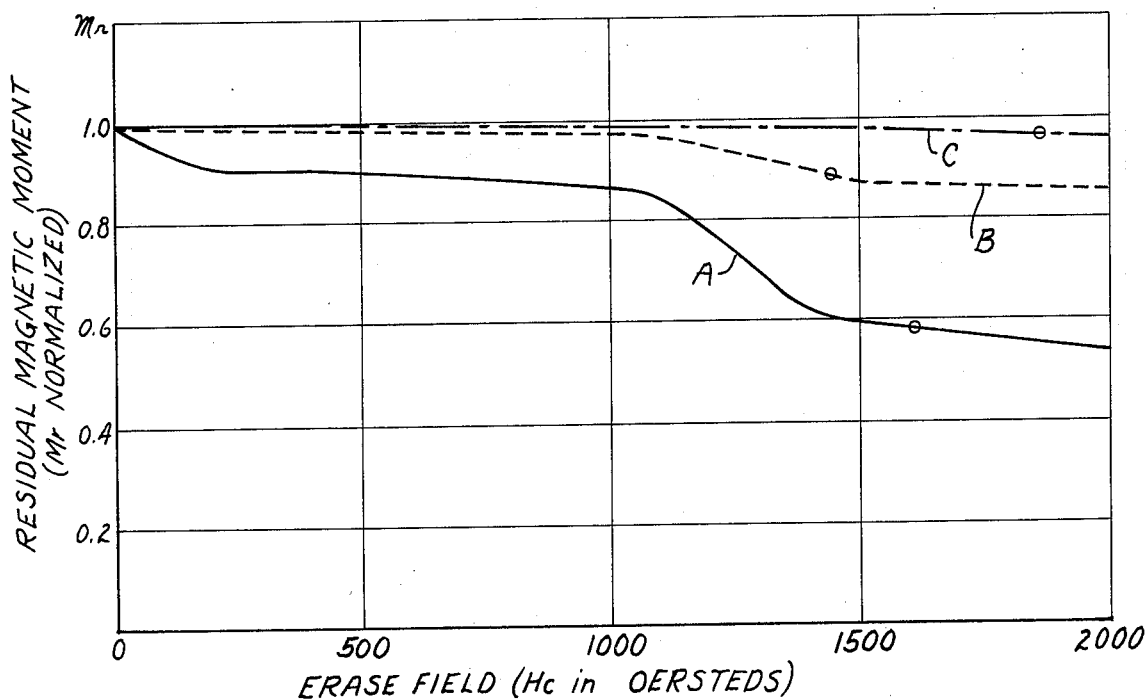
FIG. 1 is three graphs of the residual magnetic moment vs. hard axis erase field characteristics for highly anisotropic particle populations that may be employed in forming the present invention.
Figure 2:
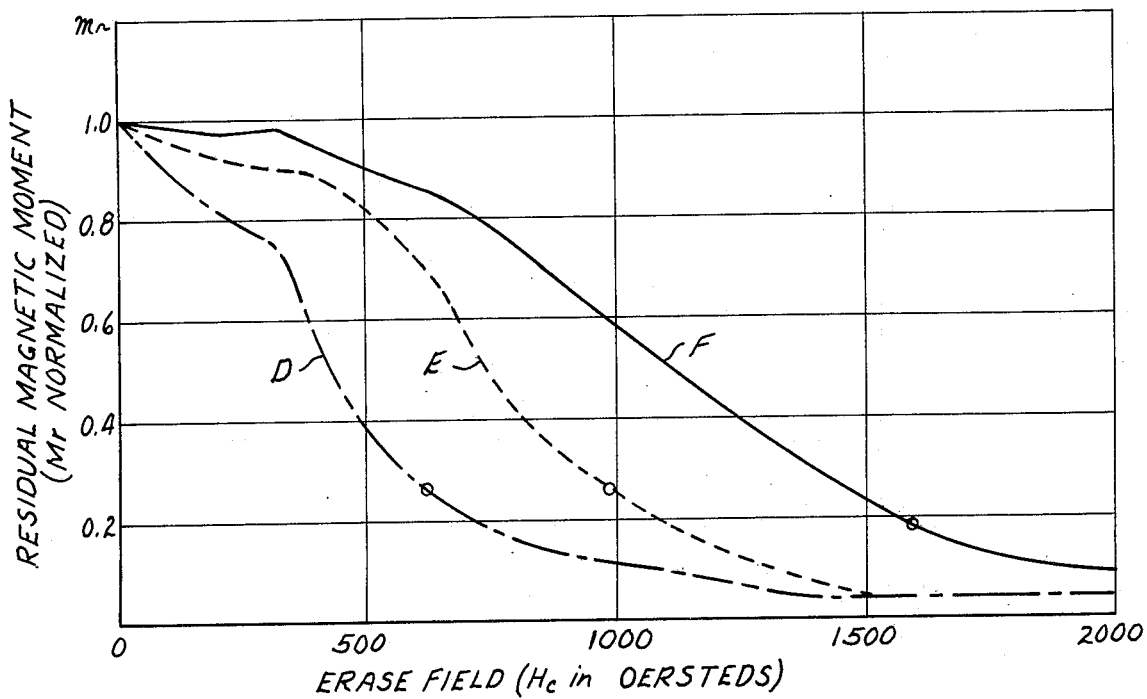
FIG. 2 is three graphs of the residual magnetic moment vs. hard axis erase field characteristics for conventional recording particle populations.

Referring now to FIGS. 1 and 2, FIG. 1 illustrates graphs of residual magnetic moment vs. hard axis erase field characteristics of three representative samples of particles that may be used in forming magnetic media of the present invention, and FIG. 2 illulstrates graphs of the same parameters of three known magnetic media not included in the present invention. In FIG. 1, graphs A, B and C respectively indicate the performance of an iron cobalt phosphide sample and two barium ferrite samples. The samples each comprised four stacked layers of ¼ in. circular disks of magnetic recording tape with parallel aligned easy axes of magnetization. The tapes were prepared by coating dispersions of the various types of magnetic particles in standard binder systems onto 1–1½ mil. polyester film using alignment methods described in a U.S. Patent to von Behren, U.S. Pat. No. 2,711,901, to produce an easy axis parallel to the longitudinal dimension of the samples. The hard axes erase fields were applied parallel to the plane of the samples, to eliminate possible errors due to shape effects. In FIG. 2, graphs D, E and F respectively indicate the performance of equant magnetite, chromium oxide, and cobalt doped iron ferrous oxide samples. The ordinates of the graphs of FIGS. 1 and 2 represent the levels of residual magnetic mooment of the samples and have been normalized for purposes of clarity. None of the coercive forces of the samples of the graphs of FIGS. 1 and 2 are the same and, therefore, the coordinates of twice the coercive force of each sample are indicated by circles on the graphs.

To determine the coordinates for plotting the graphs of FIGS. 1 and 2, a magnetic field of approximately 3000 oersteds was applied along the easy axis of each sample to induce an initial magnetic moment therein approaching saturation. Subsequently, the field was removed and the resulting level of residual magnetic moment of each sample was measured with a vibrating sample magnetometer. Such levels of residual magnetic moment were used as base levels. Next, individual readings of decreases in the base levels of residual magnetic moment of each sample in response to hard axes erase fields were obtained by applying an a.c. erase field perpendicular to the easy axis of each sample and measuring the residual magnetic moment remaining after such field application. Initially, the a.c. field was applied at a low level and then progressively increased and a measurement was made of the residual magnetic moment remaining after the application of each level of erase field.

After a hard axis erase field equal to two times the coercive force was applied perpendicular to the easy axis of the highly anisotropic samples, each had a level of residual magnetic moment remaining that was considerably higher than 40% of their base levels of residual magnetic moment (they ranged from 58% to 96% ofo such base levels). The non-highly anisotropic samples in contrast did not have over 30% of their base levels of residual magnetic moment after application of an a.c. erase field equal to two times the coercive force (they ranged from 18% to 27%). Gamma iron oxide, which is the most common recording material available, is not covered in the graphs, but was also found to fall within such 18 – 27% range. Although the samples were magnetized with a field of approximately 3000 oersteds to insure that they were sufficiently magnetized to provide meaningful results, a lower field could have been used so long as the samples werer magnetized to at least 50% of their saturated magnetic moment.

Highly anisotropic particles make the magnetic recording medium of the present invention particularly suitable for use in magnetically encoded documents that may be employed together with a document reading apparatus (as described in detail below) to provide a system that significantly impedes the unauthorized use of such documents. Referring now to FIGS. 3 and 4, a magnetically encoded document in the form of a credit card 1 is shown constructed of a nonmagnetic layer 2, that may be embossed with appropriate identifying indicia in standard fashion as indicated, and a layer 3 of the magnetic recording medium of the present invention carried by the layer 2. The layer 3 may be a single strip, as shown, or it may be a layer completely covering one side of the nonmagnetic layer 2.

In certain applications, it may be advantageous to sandwich the layer 3 between two nonmagnetic layers 2 in order to protect the layer 3 against physical damage or other hazards that could degrade its recording capability. The layer 3 preferably has a single easy axis of magnetization along the longitudinal dimension of the card 1, and two of the family of hard axes of magnetization are respectively in the plane of the card 1 and perpendicular to the plane of the card 1. The layer 3 may be applied to the layer 2 by several methods such as direct coating, coating on an intermediate substrate and subsequently transferring the coating, or bonding by means of an adhesive.

The magnetizable layer 3 of the card 1 may be encoded with magnetically recorded digital data by moving the card at a constant relative velocity past a standard magnetic read/record head 7, as shown in FIG. 5, driven by electrical signal currents represeenting digital data. To achieve optimum recording of data on the layer 3, it may be necessary to use larger write currents than those driving standard read/record heads, since the layer 3 may have a higher than standard intrinsic coercive force. Standard computer tapes generally have an intrinsic coercive force of 280–300 oersteds, whereas the highly anisotropic particles of the layer 3 will usually have an easy axis intrinsic coercive force of 500 oersteds or more, which is in the range of high energy (i.e. high coercive force) recording materials.

The read/record head 7 is a conventional ring-type head used in recording or reproducing magnetic signals from magnetic recording media. The head 7 includes a core 8 that has a small magnetizing gap 9 and an electrical coil 10 that is wound around a portion of the core 8 and is connected to electrical circuitry (not shown) that senses induced magnetization of the core 8. The orthogonal axes $(w, l, d)$ are illustrated with the read/record head 7 to indicate the direction of gap width, gap length, and gap depth respectively. Time varying currents through the coil 10 induce time varying magnetization in the core 8, resulting in a time varying magnetizing field across and adjacent the gap 9 with components substantially along the $l$ and $d$ axes only. The $l$ and $d$ components of such field may be used to record magnetization patterns corresponding to electrical signals on a magnetic recording surface translating across the gap 9. In a conventional two frequency coherent phase recording for encoding magnetic strip credit cards, the layer 3 may be magnetized to saturation with reversals of direction of the saturating field of the read/record head 7 corresponding to clock pulses and data bits. Usually the relative motion of translation of a conventional recording medium is along the $l$ axis of the head, but the relative translation of the medium may be at an angle $a$ (not shown) in the $l$-$w$ plane. Small angles of $a$ (less than 50°) are preferred, but angles up to 90° are possible.

Magnetic recording documents of the present invention may also be encoded as they are translated by the gap 9 of the read/record head 7 with relative motion of translation along the $l$ axis, but with the easy axis of the documents at a small angle $a$ in the $l$-$w$ plane. For optimum recording the easy axis of magnetization of the documents should be approximately parallel to the $l$-$d$ plane. Thus, the direction of the easy axis can be varied if a corresponding variation in the direction of the gap length is made to maintain a substantially parallel relationship between the $l$-$d$ plane and the direction of the easy axis of magnetization of the recording document.

An apparatus 11 for reading the card 1 is illustrated in FIG. 6 and includes a pair of endless belts 12 for translating the card 1 through the apparatus 11, and a hard axis field source in the form of a pair of permanent magnets 13 positioned on each side of the card 1. However, the magnets 13 may be both positioned on the side of the card 1 on which the layer 3 is affixed. In fact, in certain applications it may be more advantageous to have both the magnets 13 on the same side to apply a hard axis field in the plane of the card 1 and thereby minimize undesirable shape effects associated with magnetization perpendicular to the plane of the layer 3. A predetermined level of magnetic field is provided by the magnets 13 along the hard axis of the card 1 before the card 1 reaches a read/record head 14, similar to the head 7. The strength of the hard axis field provided by the magnets 13 preferably is between the easy axis coercive force of the highly anisotropic layer 3 and the field applied by a record head during normal recording of the layer 3. If the field of the magnets 13 is too low, conventional magnetically encoded cards will not be erased, but if the field is too high, cards of the present invention as well as conventional cards will be erased.

The provision of the hard axis field source is not restricted solely to the use of the permanent magnets 13 but instead may be provided by current carrying coils, electromagnets, or a transversely oriented erase head. However, the permanent magnets are advantageous to use because they do not require a power source. Because the magnetizable layer 3 of the card 1 is formed of highly anisotropic material, the magnetized regions along the easy axis of the layer 3 will not be sufficiently affected by the hard axis field to erase recorded data thereon, which data is retained and sensed as the card 1 passes by the read/record head 14.

Following below are a number of examples of the type of documents employing magnetic media of the present invention, which examples are described for purposes of illustration only and not of limitation.

EXAMPLE 1

A magnetically encoded document is formed with a magnetic strip of recording material of the present invention oriented with its easy axis of magnetization in the plane of the document, but at an oblique angle to the longitudinal axis of the document. The hard axes of magnetization of the strip include any axis in a plane perpendicular to the easy axis. This document is useful with reading systems where the length of the gap of the reading head is parallel to the easy axis of magnetization of the recording material.

EXAMPLE 2

A magnetically encoded document is formed with a magnetic strip of recording material of the present invention having its easy axis of magnetization oriented at an oblique angle to the plane of the magnetic strip but with no horizontal component perpendicular to the longitudinal axis of the document. The term "horizontal component" is used with reference to the document being oriented wholly within a horizontal plane.

EXAMPLE 3

A magnetically encoded document that is formed as described in Example 2 except that the easy axis of the recording material strip is oriented such that the direction of the easy axis includes a horizontal component perpendicular to the longitudinal axis of the document.

EXAMPLE 4

A magnetically encoded document is formed with a magnetic strip of recording material of the present invention having an easy axis of magnetization oriented along an axis perpendicular to the plane of the strip, and hard axes of magnetization in any direction parallel to the plane of the document.

What is claimed is:

1. A magnetic recording medium that includes a uniformly aligned population of uniaxially highly anisotropic particles with an easy axis and a plurality of hard axes of magnetization and an easy axis intrinsic coercive force less than 1900 oersteds, whereby when said population is initially magnetized with a field of at least 2500 oersteds applied along said easy axis, the level of residual magnetic moment of said population will be greater than 40% of the initial residual magnetic moment after the application along one of said hard axes of an a.c. erase field of peak value equal to two times the intrinsic easy axis coercive force of the population.

2. A magnetic recording medium as recited in claim 1, wherein the anisotropy and alignment of said magnetic particles is sufficient to enable substantial erasure of the residual magnetic moment of substantially all of said particles with a predetermined intensity magnetic field applied along the easy axis of said particles and whereas the same intensity magnetic field applied along the hard axis of said particles is insufficient to produce such erasure.

3. A magnetic recording medium according to claim 1, wherein said magnetic particles are formed of one or more of barium, strontium and lead ferrites.

4. A magnetic recording medium as recited in claim 1, wherein the intrinsic coercive force of said population is no more than 1600 oersteds.

5. A magnetic recording medium as recited in claim 1, wherein said medium is carried in surface-to-surface contact with a substrate layer of nonmagnetizable material to form a machine readable magnetically encoded document.

6. A magnetic recording medium as recited in claim 5, wherein said easy axis of magnetization of said particle population is oriented parallel to the longitudinal axis of said strip.

7. A magnetic recording medium as recited in claim 5, wherein the easy axis of said magnetization of said particle population is oriented perpendicular to the plane of said strip.

8. A magnetic recording medium as recited in claim 5, wherein said easy axis of magnetization of said particle population is oriented at an oblique angle with the longitudinal axis of said strip.

9. A magnetic recording medium as recited in claim 8, wherein the easy axis of said particle population is also oriented parallel to the plane of the document.

10. A machine readable magnetically encoded document having:
a substrate layer;
a strip of magnetic recording material held in surface-to-surface contact with said substrate layer, which recording material includes a uniformly aligned population of uniaxially highly anisotropic particles, with an easy axis and a plurality of hard axes of magnetization and an easy axis intrinsic coercive force less than 1900 oersteds, whereby when said population is initially magnetized with a field of at least 2500 oersteds applied along said easy axis, the level of residual magnetic moment of said population will be greater than 40% of the initial residual magnetic moment after the application along one of said hard axes of an a.c. erase field of peak value equal to two times the intrinsic easy axis coercive force of the population.

11. A magnetically encoded document as recited in claim 10, wherein the anisotropy and alignment of said particle population of said recording medium is sufficient to enable substantial erasure of the residual magnetic moment of substantially all of said particles with a predetermined intensity magnetic field applied along the easy axis of said particles but whereas the same intensity magnetic field applied along the hard axis of said particles is insufficient to produce such erasure.

* * * * *